(12) United States Patent
Keller (10) Patent No.: US 6,415,543 B2
(45) Date of Patent: *Jul. 9, 2002

(54) AUTOMATIC FISHING ROD DEVICE FOR JIGGING AND TROLLING

(76) Inventor: Frederick Jacob Keller, 140 McCracken Dr., Seneca, SC (US) 29678

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,990

(22) Filed: Sep. 9, 1999

(51) Int. Cl.[7] .................... A01K 87/00; A01K 97/10
(52) U.S. Cl. ............................ 43/19.2; 43/26.1
(58) Field of Search .................. 43/19.2, 26.1

(56) References Cited

U.S. PATENT DOCUMENTS

| | | | | |
|---|---|---|---|---|
| 2,758,407 A | * | 8/1956 | Speidell | 43/19.2 |
| 2,992,504 A | * | 7/1961 | Cape | 43/19.2 |
| 3,568,352 A | | 3/1971 | Hill | 43/17 |
| 3,600,837 A | | 8/1971 | Bristol | 43/19.2 |
| 3,691,668 A | * | 9/1972 | Strebig | 43/19.2 |
| 3,839,810 A | * | 10/1974 | Lagrasse | 43/19.2 |
| 4,251,939 A | | 2/1981 | Tiede | 43/19.2 |
| 4,597,215 A | | 7/1986 | Otremba | 43/19.2 |
| 4,603,499 A | * | 8/1986 | Simborski | 43/19.2 |
| 4,660,317 A | * | 4/1987 | Evans | 43/19.2 |
| 4,916,847 A | * | 4/1990 | Rusgo | 43/19.2 |
| 4,932,151 A | * | 6/1990 | Cicha | 43/19.2 |
| 4,951,411 A | * | 8/1990 | Ecker | 43/19.2 |
| 5,056,255 A | * | 10/1991 | Campbell | 43/19.2 |
| 5,119,580 A | | 6/1992 | Schulte et al. | 43/19.2 |
| 5,437,121 A | | 8/1995 | Chacon, Jr. et al. | 43/19.2 |
| 5,540,010 A | | 7/1996 | Aragona | 43/19.2 |
| 5,570,534 A | * | 11/1996 | Ford | 43/19.2 |
| 6,009,656 A | * | 1/2000 | Knepp | 43/19.2 |

* cited by examiner

*Primary Examiner*—Kurt Rowan
(74) *Attorney, Agent, or Firm*—McNair Law Firm, P.A.

(57) ABSTRACT

A simplified and reliable automatic fishing device is disclosed which may be operated in one of a plurality of fishing configurations to produce desired fishing motions to a fishing rod held on the device wherein the device is automatically disengaged from operation when a fish strikes.

26 Claims, 10 Drawing Sheets

AUTOMATIC FISHING ROD DEVICE FOR JIGGING AND TROLLING

BACKGROUND OF THE INVENTION

The invention relates to the field of fishing and, particularly, to a device for automatically simulating a natural jigging or trolling motion to a fishing rod and bait.

In many types of fishing, for example striper, white bass, hybrid bass, white perch, crappie, and many others, it is desirable to raise and lower a bait in what is commonly referred to as a "jigging" motion. The bait may be either artificial or live. However, the problem arises that one usually would like to put out several lines, but a person can usually only handle one fishing rod manually to impart the jigging motion. Typically, these types of fish will be found schooling. It is desirable to put as many lines out as possible when a school is found. Often, other lines will be put out with live bait, but only one line can be fished with a jigging motion. In addition, one often tires of producing the jigging motion manually.

Heretofore, various devices have been proposed for oscillating either a fishing rod or the fishing line to simulate an up and down motion to a bait. For example, U.S. Pat. Nos. 5,540,010, 5,119,580 and 4,597,215 teach a fishing rod apparatus which includes an oscillating handle holder to raise and lower a bait in the water. U.S. Pat. Nos. 5,437,121 and 4,251,939 disclosed devises for supporting a fishing rod to provide an oscillating motion wherein the rod itself is engaged by a rotating member rather than by being placed in an oscillating handle holder.

U.S. Pat. Nos. 3,600,837 and 3,568,352 disclose fishing devices wherein the fishing line is oscillated up and down to move the bait.

However, several problems have been encountered with the prior art, mainly the relative complex construction of the devices which affects their reliability. A good fishing trip can quickly turn bad if such a device malfunctions and cannot be fixed because of its complexity. Further, the prior art devices have not been satisfactory when it is desired to employ a large number of the devices because one must pay strict attention to the devices, particularly when there is a fish strike. Often, the construction allows the device to continue to oscillate, even after a fish has hit the line which can cause slack in the line. The fish can easily break the line or become unhooked.

Accordingly, an object of the invention is to provide a relatively simple and reliable device for imparting a natural jigging action to a fishing rod and bait.

Another object of the invention is to provide a fishing rod holder which imparts an automatic and natural jigging motion to a fishing rod held thereby which does not require strict attention when a fish strikes.

Another object of the invention is to provide a fishing rod holder device which imparts a natural jigging motion to a fishing rod when held thereby, or can impart a natural fishing motion when trolling.

Yet another object of the invention is to provide a fishing rod holder device for automatically simulating a jigging motion in which the motion is automatically terminated upon the hooking of a fish.

SUMMARY OF THE INVENTION

The above objectives are accomplished according to the present invention by providing an automatic fishing device for automatically moving a fishing bait secured to a fishing rod comprising a base for attachment to an associated structure; and a jig arm pivotally carried by the base for oscillating in a pivoting motion. A rod holder is carried by the jig arm for securely holding a fishing rod on the jig arm with the tip of the rod extending from the rod holder. A cam supports the jig arm under a force of gravity, and a motor rotating drive rotates the cam to cause the jig arm and fishing rod to oscillate and impart a natural fishing motion to the fish bait. A stop member limits the upward movement of the jig arm to an off cam position where the jig arm no longer contacts the cam, and is adjustable for adjusting the off cam position of the upward travel. Preferably, the invention includes a rod positioning element for adjusting the longitudinal position of the fishing rod when held by the rod holder of the jig arm. The rod positioning element may include a post carried by the jig arm and a plurality of positions defined on the jig arm at which the longitudinal position of the post may be fixed. The rod holder includes a rear bracket carried by the jig arm in which the butt of the rod is received. The rod holder includes a pair of spaced arms carried by the front end of the jig arm with the adjustable post disposed between the rear bracket and the pair of arms for engaging a portion of the fishing rod when carried by the rod holder. The device may also include a weight mount for removably affixing a counterweight to the jig arm to balance the fishing rod as held on the jig arm alone, or in combination with the adjustable rod positioning, so that the jig arm is biased against the cam when the fishing rod is held on the jig arm. Advantageously, a removable trolling attachment may be carried by the jig arm for supporting the fishing rod in a trolling position so that the oscillating jig arm causes the fishing rod and bait to move at continuously varying speeds during trolling. The trolling attachment includes a rod support for holding the fishing rod in an elevated position relative to the jig arm for trolling. The trolling attachment holds the fishing rod for movement between an angle slightly forward of true vertical to a lower, horizontal angle when held during trolling.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

The drawings illustrate an automatic fishing device, designated generally as A, for producing a natural jigging or trolling motion to a fishing rod 10 which is mounted on a jig arm of the device, designated generally as B. A handle portion 10a of the rod 10 rests on the jig arm with a rod butt 10b received under a rear bracket illustrated in the form of a U-bolt 12 affixed to the rear of the jig arm. Jig arm B is pivotally mounted to a base 13 in the form of a vertical standard 14. Vertical standard 14 is in turn affixed to a mounting block 16 which is adapted for mounting to the gunwale of a boat or other associated fixed structure 16a. A small electric motor 18 is affixed to base standard 14 and includes a drive shaft 18a which is eccentrically mounted to a cam 20 (FIGS. 2 and 3), to provide an oscillating drive to jig arm B. Motor 18 may be a 12 volt motor which is powered by the boat or other battery and the like. As can best be seen in FIGS. 2 through 4, jig arm B rests on top of cam 20 by means of gravity. It is to be noted that while a motor is disclosed, other means for oscillating the jig arm may be utilized such as a solenoid-magnet combination or other such mechanism.

Figure 2:
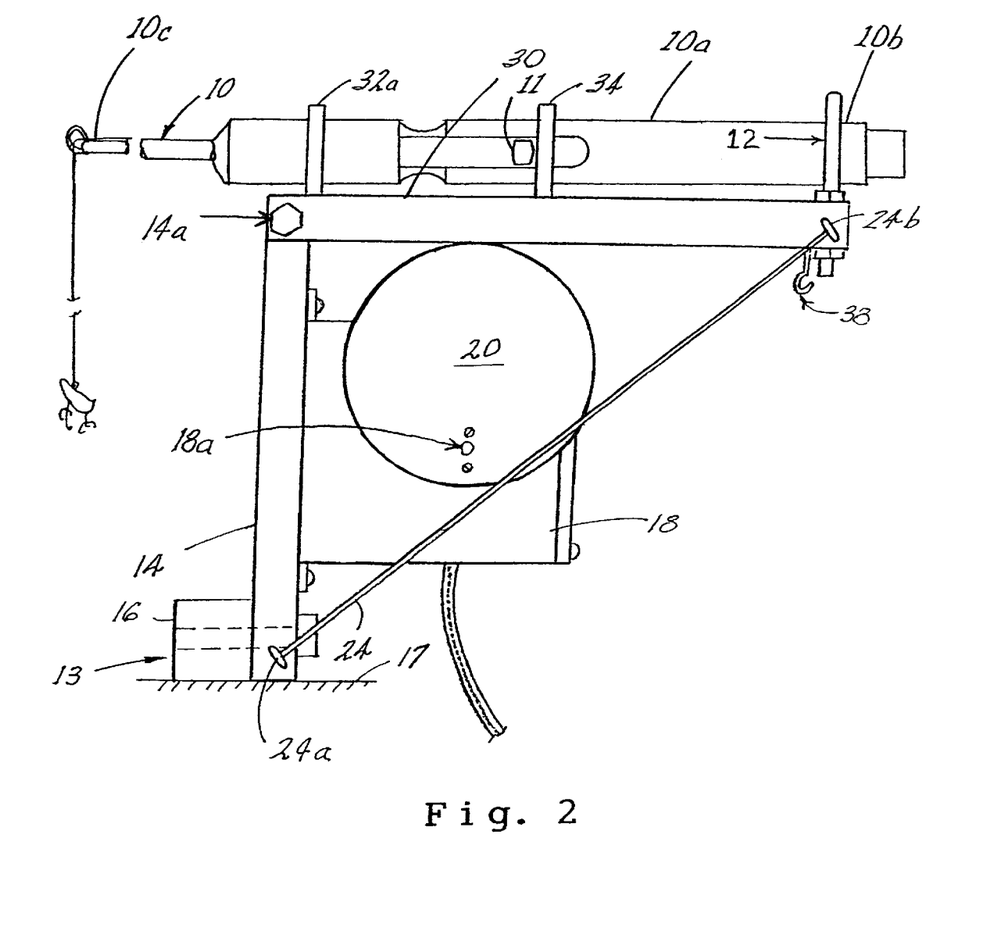
FIG. 2 is a side elevation of an automatic fishing device with the jig arm at the highest point of the motion.
Figure 2A:
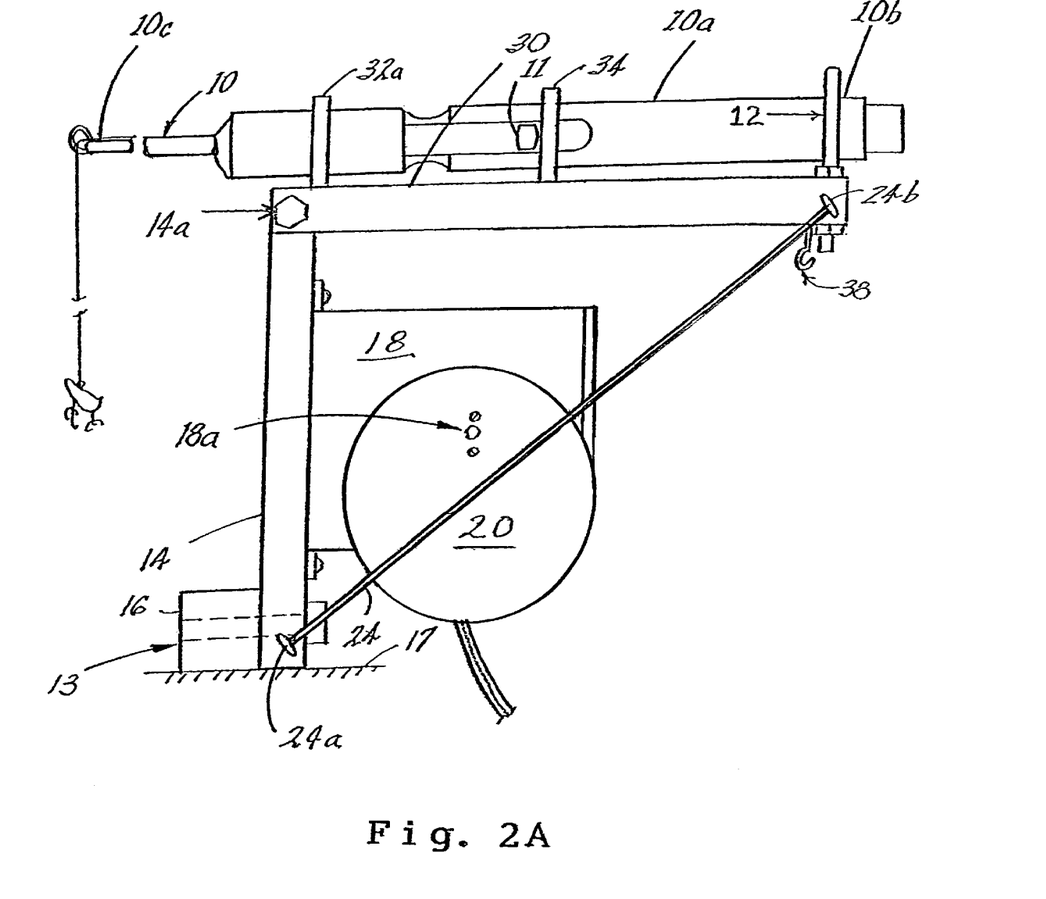
FIG. 2a is a side elevation of an automatic fishing device with the jig arm at its highest point and separated from the cam.
Figure 4:
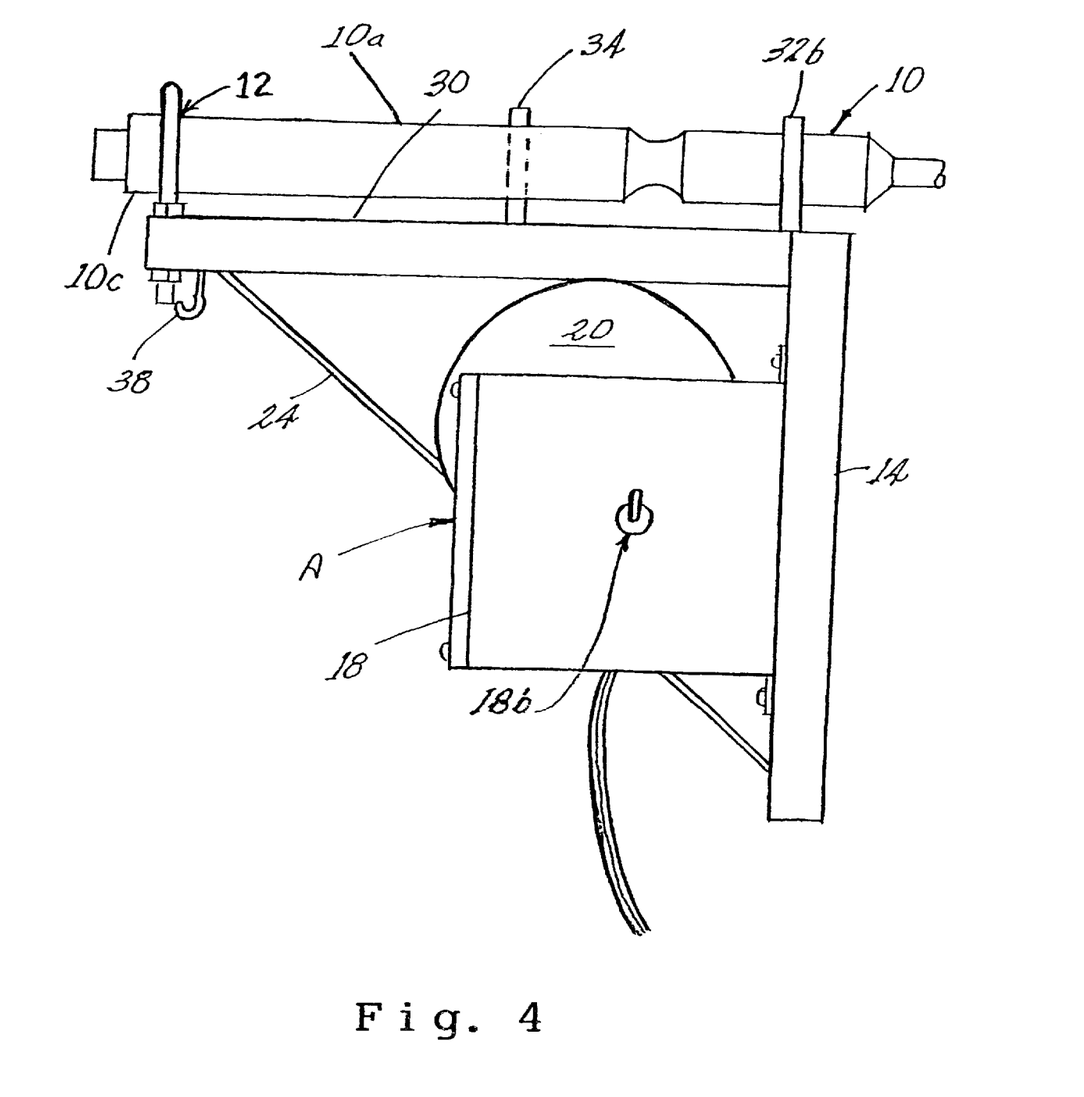
FIG. 4 is a side elevation, taken from the opposite side of FIGS. 2 and 3, illustrating the jig arm at its highest position.

There is a stop member in the form of a strike cord 24 which limits the pivotal movement of jig arm B in an upward, counterclockwise direction. One end of 24a of cord 24 is attached to base standard 14 and an opposite end 24b is attached to jig arm B. When a fish strikes, rod tip 10c is pulled down which pulls the jig arm B and rod butt 10b up in the counterclockwise direction about pivot 14a. The strike cord stops the jig arm from rotating past a limit set by the length of the strike cord, which can be adjusted manually. This arrangement produces the result that the jig arm is lifted off of the cam to an "off cam position" (FIG.2 a) when a fish strikes or is hooked so that the motor is not forced to stall by the action of the fish. In addition, when the fish strikes and the jig arm is lifted off the cam, the up and down jigging motion is no longer imparted to the rod and it can be easily removed from the fishing rod holder to reel in the fish. Stop member 24 is adjusted so it is slightly beyond the highest point of movement of the jig arm on cam 20 (FIGS. 2 and 4). While a cord is illustrated, it is to be understood that other flexible strands, fixed abutments and other means can be provided for limiting the upward movement of the jig arm.

Figure 1:
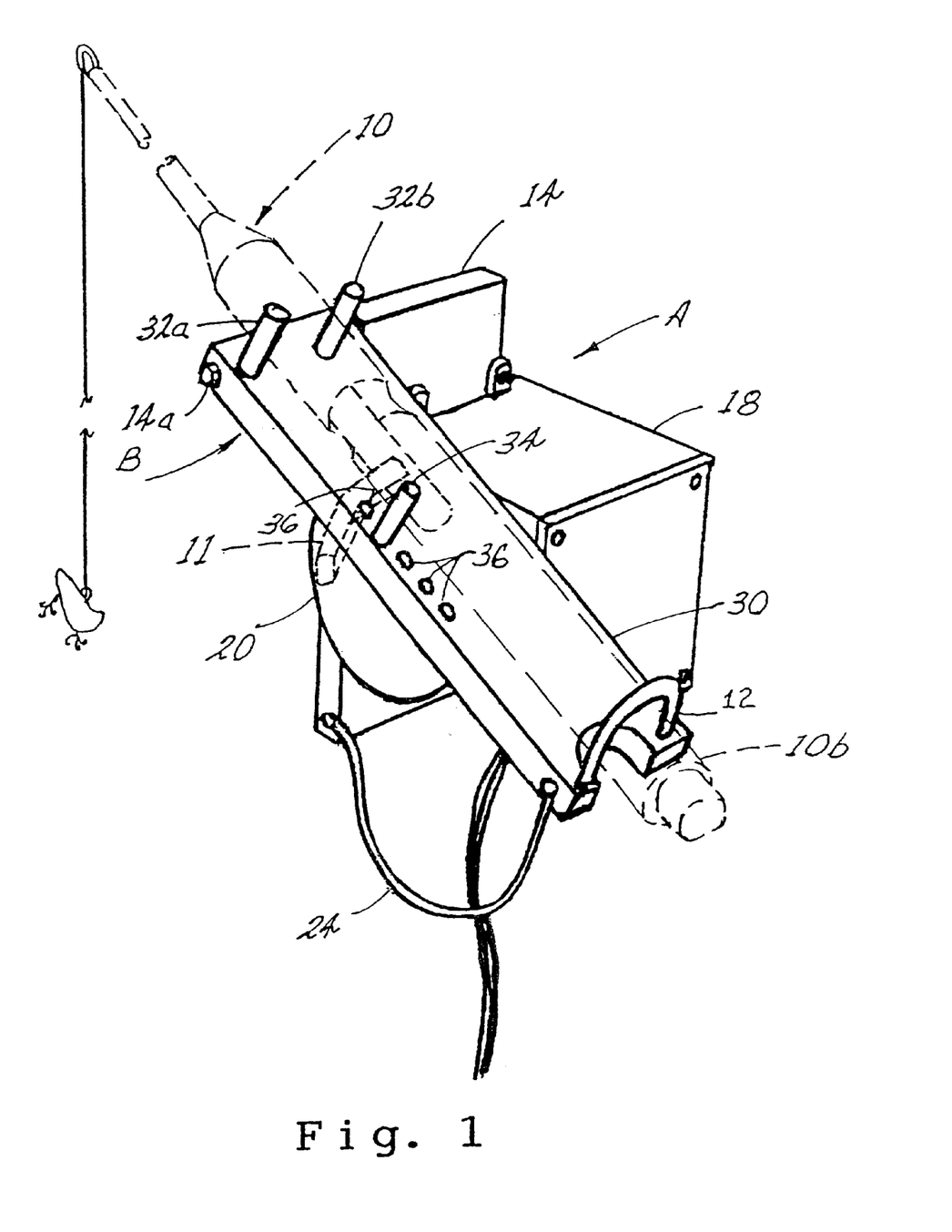
FIG. 1 is a perspective view of an automatic fishing device according to the invention.
Figure 5:
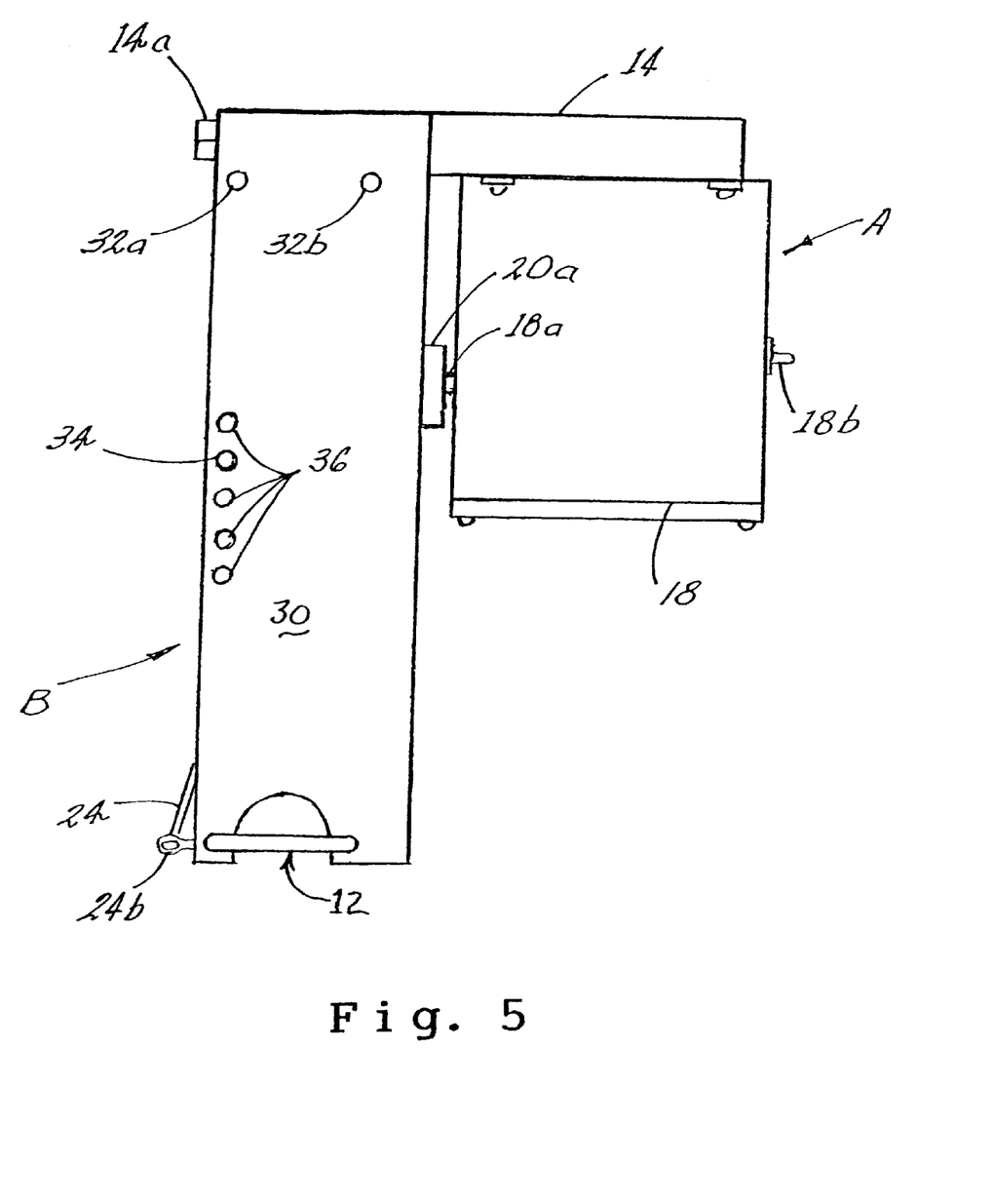
FIG. 5 is a top plan view of the automatic fishing device with the jig arm at the highest point of motion.
Figure 6:
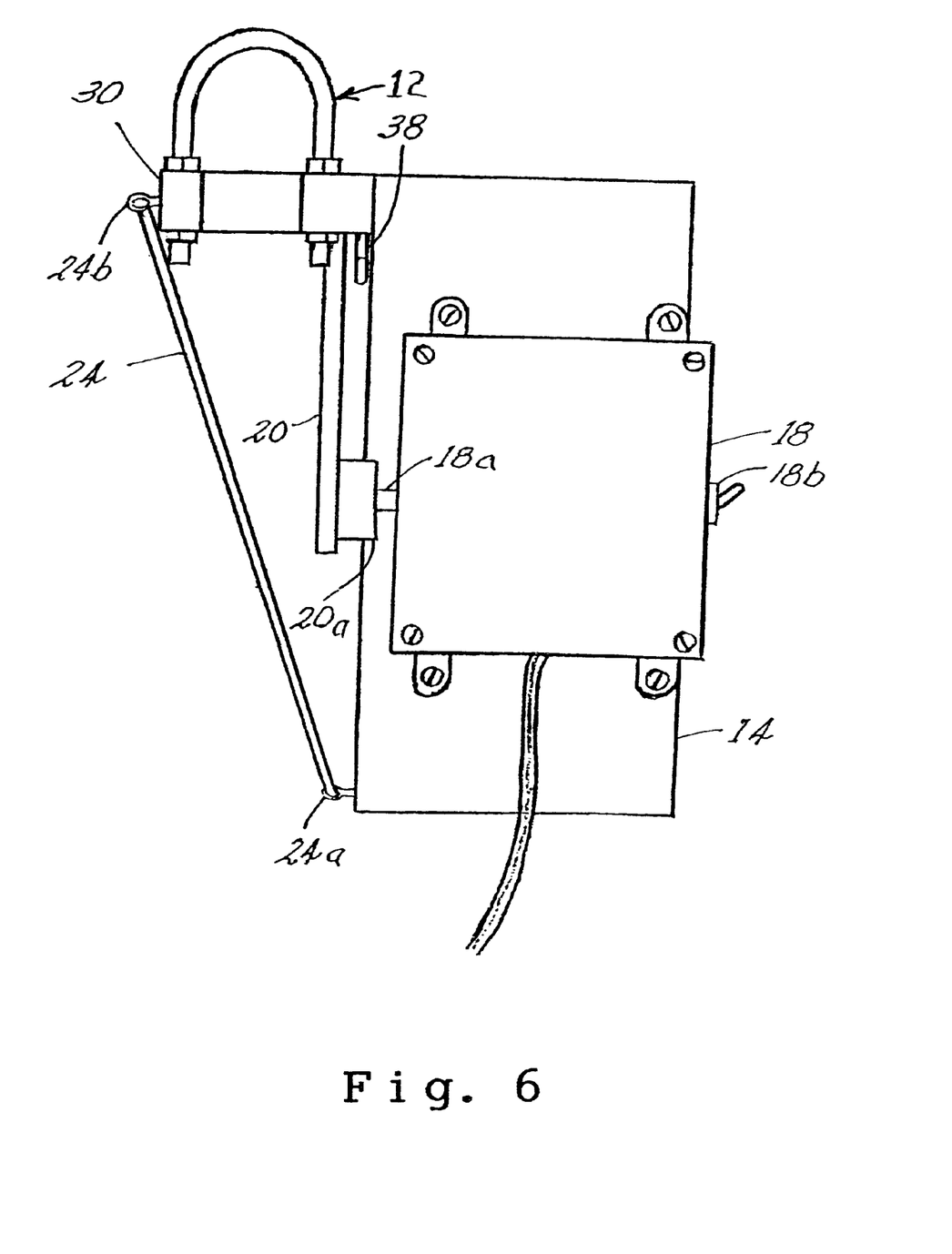
FIG. 6 is a rear view of the automatic fishing device with the jig arm at the highest point of motion.

As can best be seen in FIGS. 1 and 5, jig arm B includes rod holder 29 having a plate 30 having a pair of spaced arms 32a and 32b carried at a forward end between which the fishing rod is held in a first fishing configuration, an adjustable element in the form of a post 34, and U-bolt 12 at the end. It is to be understood, of course, that other forms of rod holders may also be used. Adjustable post 34 engages an arm 11 of a reel (not shown) carried on rod 10, and may be adjusted in its longitudinal position on the jig arm by means of a series of adjustment openings 36 or other suitable mounts. The purpose of the adjustable post 34 is to allow adjustment of the position of the handle portion 10a of the fishing rod so that the fishing rod is balanced on the jig arm with gravity forcing the jig arm against cam 20. That is, the fishing rod may be balanced so it does not tip forward about pivot 14a when resting but tilts rearwardly and bears against the cam. For this purpose, a weight mount for counterweight affixation is provided by a weight hook 38 (FIGS. 2, 3, and 4) affixed to the rear of the jig arm for the attachment of counterweights when rods having extra long handles are used. When using heavy lures there may also be a need for a counterweight to balance the fishing rod on the jig arm so that it is balanced against the cam by gravity. This also allows an alternate method for balancing the system, rather than moving the adjustable handle post toward the rear. As noted, counterweight is useful when using a rod with a very long handle. A rod with a very long handle may be difficult to slide out of the U-bolt when a large fish is hooked and the rod handle extends substantially behind the U-bolt. This is because the additional distance that a long handle rod extends beyond the U-bolt makes it difficult to remove the rod.

Figure 12:
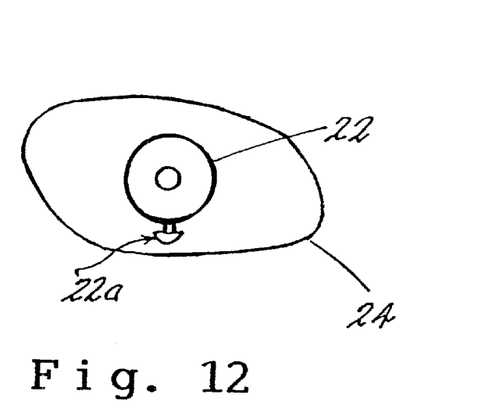
FIG. 12 is an alternate embodiment of a cam for imparting a fishing motion using the automatic fishing device of the present invention.
Figure 13:
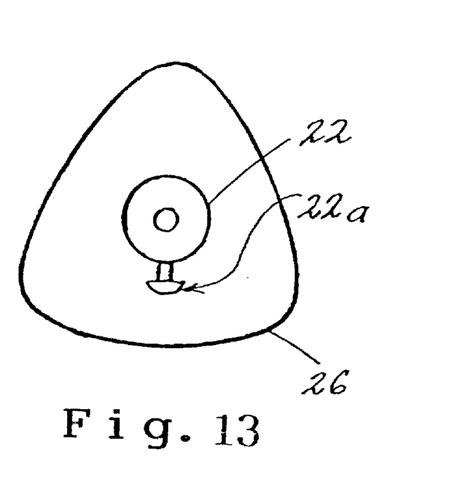
FIG. 13 is an alternate embodiment of a cam for an automatic fishing device according to the invention.

Referring now to cam 20 in detail, it will be noted that the driveshaft 18a of motor 18 is inserted into an insert 22 of cam 20 at an eccentric or off center position to define a cam apex. A lock screw 22a locks the cam on the shaft. The position of the motor shaft relative to the center of the cam determines the range of motion of the jig arm. The cam in the illustrated embodiment produces 40 degrees of motion to the fishing rod. That is, there is a 40 degree range between the horizontal, high point position of FIG. 1, and the rear, inclined, low point position of FIG. 3. Preferably, motor 18 operates at 20 RPM so that a complete up and down oscillation of the fishing jig occurs every 3 seconds. Alternately, FIG. 12 illustrates another embodiment of a butterfly cam 24 wherein the cam causes the oscillation frequency for the jig arm to double the frequency as with the circular cam of FIG. 10. In another alternate embodiment FIG. 13 illustrates a triangular cam 26 which imparts an oscillation frequency to the jig arm that is 3 times that of circular cam 20.

Figure 3:
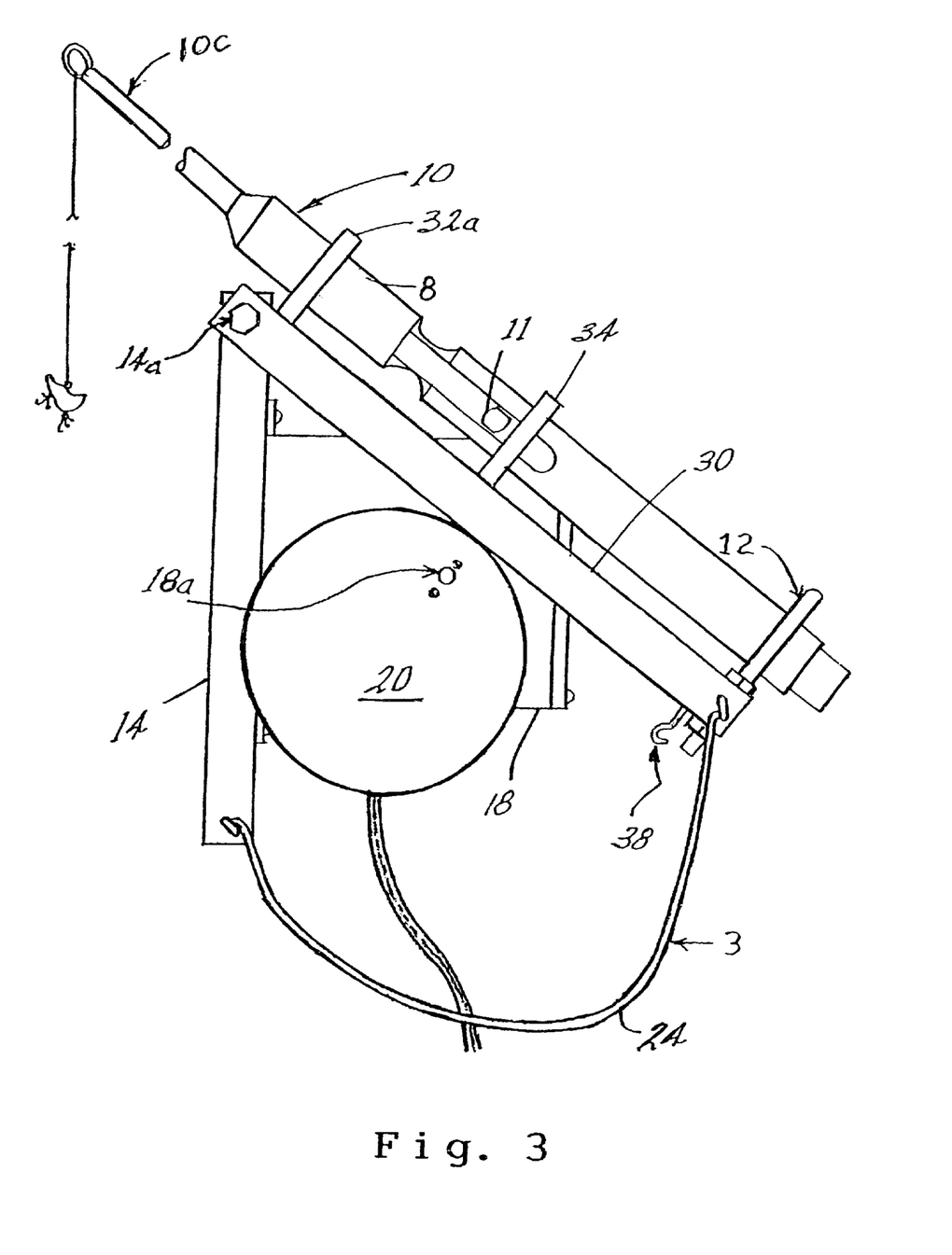
FIG. 3 is a side elevation of an automatic fishing device with the jig arm at the lowest point of the motion.
Figure 7:
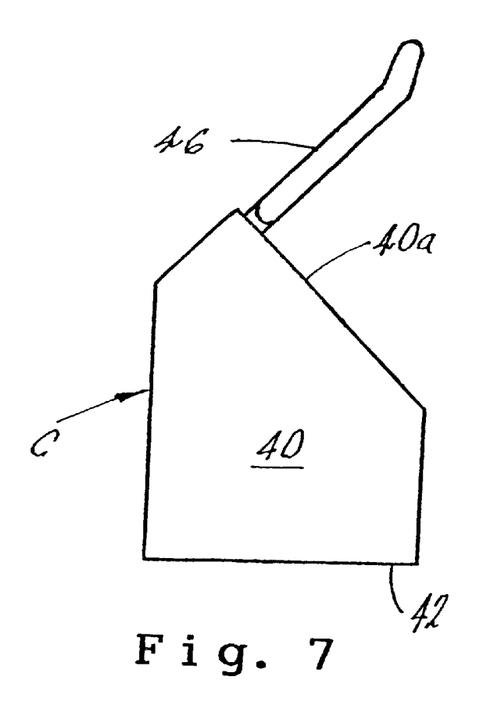
FIG. 7 is a side elevation of a trolling attachment for use with an automatic fishing device according to the invention.
Figure 8:
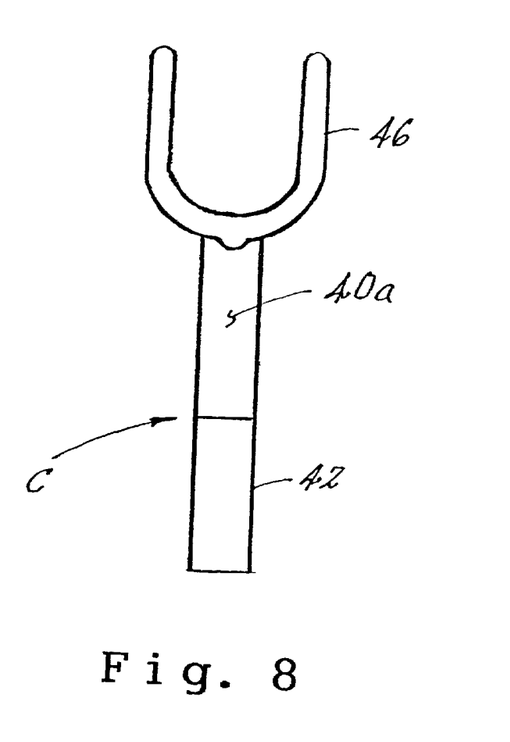
FIG. 8 is a rear elevation of the trolling attachment of FIG. 7.
Figure 9:
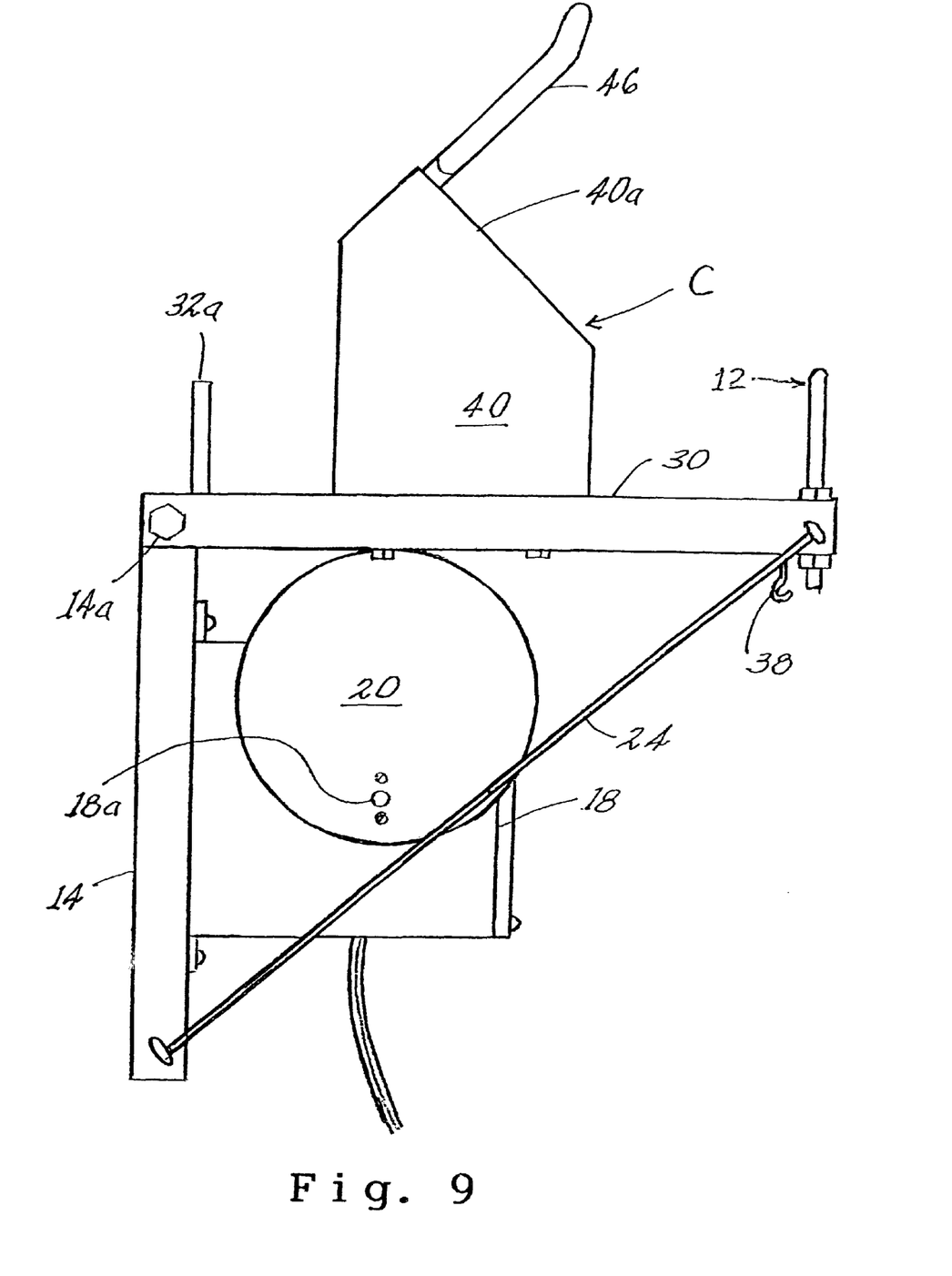
FIG. 9 is a side elevation of the automatic fishing device with the trolling attachment mounted to the jig arm to produce a stop and go action to a trolled artificial or natural bait.

Referring now to another advantageous aspect of the invention, as can best be seen in FIGS. 7 through 9, a trolling attachment, designated generally as C, is illustrated which includes an elevated rod support in the form of a block 40 in the illustrated embodiment for supporting a fishing rod in a second fishing configuration. The rod support includes a base 42 which may be affixed to jig arm B by means of bolts 44. An inclined surface 40a of trolling attachment 40 includes a fork 46 between which a fishing rod is held. With fishing rod 10 inserted between fork 46 and U-bolt 12, it can be seen that the fishing rod is in a substantially elevated position relative to being held directly on the jig arm. In this position, using the illustrated cam 20, fishing rod 10 is held in a position 85 degrees above the horizontal when jig arm B is at its lowest position. The fishing rod is moved from 45 to 85 degrees above horizontal as jig arm B moves from its highest position (FIG. 9) to its lowest position, as can be seen in FIG. 3. This causes a natural or artificial bait to move in a "stop-and-go" motion through the water when the boat is moving slowly during trolling. The motion imparted to the bait is that of a stop and go motion which simulates the natural motion of a wounded fish. This is highly attractive to predatory fish and enhances the trolling fishing.

In operation when jigging, the jig arm is raised and lowered by means of the cam engaging against the bottom of the jig arm. The fishing rod, securely held by the jig arm, is thus pivoted in a natural jigging motion so that the artificial bait at the end of the line is raised and lowered. In use, the stop member, which is strike cord 24 in the illustrated embodiment, is adjusted to have a length slightly greater than the highest point of the motion produced by the apex of the cam. In this manner, the stop member does not interfere with the motion of the cam. However, when a fish strikes the line, and the hook is set, the fish typically pulls the fishing line out. The fish may move down or horizontally in any direction. The fish does not necessarily descend. In any case, the fish's action will pull on the line, which pulls the rod tip down and the rod butt up. This pulls the rod tip down causing the jig arm to pivot up by means of the rod butt engaging in the U-bolt since the jig arm axis 14a is forward of cam axis 18a (FIG. 2). As the rod tip is pulled down, the stop member limits the movement of the back of the jig arm so that the rod tip can only be pulled down a certain amount. As the fish continues its travel, the rod tip will bend. However, the fisherman will have had adequate time to take the rod handle from the jig arm and begin to play the fish in. Alternately, the fisherman may leave the fish on the line, normally without losing the fish, if the drag is properly set, until he has time to attend to the fish. The flexible rod and drag adjustment will normally maintain the fish on the line temporarily.

In trolling, the trolling arm is placed on the jig arm. This places the fishing rod at a steeper vertical position, almost upright. In this manner, with the rod tip elevated, the line is at a proper angle for trolling. In operation, the cam likewise raises and lowers the jig arm. However, the resulting action on the artificial bait is one of motion generally in a horizontal plane rather than a vertical plane. This produces a natural skipping motion to the bait as it is pulled through the water. The skipping motion allows the bait to have a stop and go appearance which simulates the appearance of a wounded bait fish.

Figure 10:
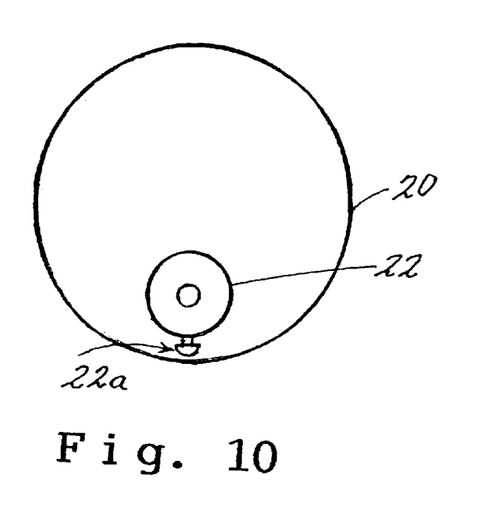
FIG. 10 is a front elevation of a circular cam for imparting a jigging or trolling motion to a fish bait having a 40 degree cam.
Figure 11:
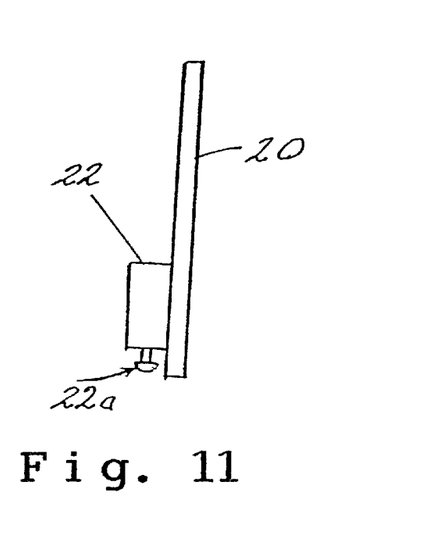
FIG. 11 is a side elevation of the cam of FIG. 10.

As noted, different cams can be used to cause the fishing jig to go up and down at different rates and in different patterns. In the illustrated example, an electric motor is used which operates at about 20 RPM. Thus, the fishing jig is raised and lowered about 20 times per minute, or once every 3 seconds (FIGS. 10 and 11). The cam 24 illustrated in FIG. 12 produces an oscillation every 1½ seconds. The cam 26 illustrated in FIG. 13 produces an oscillation ever second. The adjustable post openings are provided so that the handle may be slid rearwardly on the jig arm to properly balance the jig arm. It is important that the jig arm rests on the cam by means of gravity. Accordingly, the rod handle can be adjusted so that the jig arm bears against the cam and is not lifted up away from the cam with the fishing rod held thereon. In the event the fishing rod is light, or for other reasons it cannot be properly balanced on the jig arm, weight may be added to the hook for balance so that the jig arm is balanced against the cam for oscillation. For example, if the rod handle protrudes too far behind the rear U-bolt it is difficult to remove the fishing rod when a fish strikes. For that reason, fishing rods with long handles may require that the rod be placed more forward on the jig arm so that the fishing rod can be removed easily when a fish strikes. In this case, additional weight on the hook may be needed.

Thus, it can be seen that an advantageous construction can be had for an automatic fishing device which can be used for either jig fishing or trolling. The device is simple, having few moving parts, and thus reliable. The device is automatically disengaged if a fish strikes so that the motor does not stall or the fish be allowed to break the line or become unhooked due to continued oscillation and slack line. The device is versatile and may be quickly changed over for trolling, for different oscillation patterns, and accommodates different types and sizes of rods and handles.

While a preferred embodiment of the invention has been described using specific terms, such description is for illustrative purposes only, and it is to be understood that changes and variations may be made without departing from the spirit or scope of the following claims.

What is claimed is:

1. An automatic fishing device for automatically moving a fishing bait secured to a fishing rod in the water comprising:

a base for attachment to an associated structure;

a jig arm pivotally carried by said base for oscillating in a pivoting motion said jig arm having a pivot axis;

a rod holder carried by said jig arm for securely holding a fishing rod on said jig arm with a tip of said rod extending from the rod holder;

a cam located beneath said jig arm upon which said jig arm rests under a force of gravity; and a drive for moving said cam about a cam axis to cause said jig arm and fishing rod to oscillate in an up and down jigging motion simulating a natural fishing motion to said fish bait;

said pivot axis of said jig arm being disposed forward of said cam axis allowing movement of the jig arm about said pivot axis into a position off of the cam whereby, when a fish strikes said fishing bait, said jig arm is rotated about said pivot axis into a stationary position off said cam eliminating said up and down jigging motion, providing for easy removal of said rod holder from said jig arm and eliminating drag on said drive.

2. The device of claim 1 including a stop member for limiting the upward movement of said jig arm.

3. The device of claim 2 wherein said stop member is constructed and arranged to limit the upward movement of said jig arm to an off cam position where said jig arm no longer contacts said cam.

4. The device of claim 3 wherein said stop member comprises a strike cord carried by said base and connected to said jig arm to limit the upward movement of said jig arm.

5. The device of claim 3 wherein said stop member is adjustable for adjusting said off cam position of the upward travel.

6. The device of claim 1 including a rod positioning element for adjusting a longitudinal position of the fishing rod when held by said rod holder of said jig arm.

7. The device of claim 6 including a weight mount for removably affixing a counterweight to said jig arm to balance the fishing rod as held on said jig arm so that said jig arm is biased against said cam when the fishing rod is held on said jig arm.

8. The device of claim 7 wherein said weight mount includes an affixation element carried by a rear of said jig arm for removably affixing the counterweight.

9. The device of claim 1 including a trolling attachment removably carried by said jig arm for supporting the fishing rod in a trolling position so that said oscillating jig arm causes the fishing rod and bait to move in a stop-and-go motion during trolling.

10. The device of claim 9 wherein said trolling attachment includes a rod support for holding the fishing rod in an elevated position relative to said jig arm for trolling.

11. The device of claim 10 wherein said rod support includes an inclined surface and a fork carried near a forward end of said inclined surface for holding the fishing rod on said trolling attachment.

12. The device of claim 9 wherein said trolling attachment holds the fishing rod at an angle forward of true vertical when held during trolling.

13. An automatic fishing device for automatically moving a fishing bait secured to a fishing rod in the water comprising:

a base for attachment to an associated structure;

a jig arm pivotally carried by said base for oscillating in a pivoting motion, said jig arm having a pivot axis;

a rod holder carried by said jig arm for securely holding a fishing rod on said jig arm with a tip of said rod extending from the rod holder;

a cam upon which said jig arm rests under a force of gravity;

a drive for moving said cam about a cam axis to cause said jig arm and fishing rod to oscillate and impart a natural fishing motion to said fish bait;

said pivot axis of said jig arm being disposed forward of said cam axis allowing movement of the jig arm about said pivot axis into a position off of the cam when a fish strikes reducing the possibility the fish is lost; and a rod positioning element for adjusting a longitudinal position of the fishing rod when held by said rod holder of said jig arm, said rod positioning element including a post carried by said jig arm and a plurality of positions defined on said jig arm at which the longitudinal position of said post may be fixed.

14. The device of claim 13 wherein said rod holder includes a rear bracket carried by said jig arm in which a butt of the rod is received.

15. The device of claim 14 wherein said rod holder includes a pair of spaced arms carried by a front end of said jig arm with said adjustable post disposed between said rear bracket and said pair of arms for engaging a portion of the fishing rod when carried by said rod holder.

16. An automatic fishing device for automatically moving a fishing bait secured to a fishing rod in the water comprising:

a base for attachment to an associated structure;

a jig arm pivotally carried by said base for oscillating in a pivoting motion, said jig arm having a pivot axis;

a rod holder carried by said jig arm for securely holding a fishing rod on said jig arm with a tip of said rod extending from the rod holder;

a cam upon which said jig arm rests under a force of gravity;

a drive for moving said cam about a cam axis to cause said jig arm and fishing rod to oscillate and impart a natural fishing motion to said fish bait;

said pivot axis of said jig arm being disposed forward of said cam axis allowing movement of the jig arm about said pivot axis into a position off of the cam when a fish strikes reducing the possibility the fish is lost; and, a weight mount for removably affixing a counterweight to said jig arm to balance the fishing rod as held on said jig arm so that said jig arm is biased against said cam when the fishing rod is held on said jig arm.

17. The device of claim 16 wherein said weight mount includes an affixation element carried by a rear of said jig arm for removably affixing the counterweight.

18. An automatic fishing device for automatically moving a fishing bait secured to the line of a fishing rod comprising:

a base for attachment to an associated structure;

a jig arm pivotally carried by said base;

a rod holder carried by said jig arm for securely holding a fishing rod on said jig arm in a first configuration for producing a first fishing motion;

an inclined rod support carried by said jig arm for supporting said fishing rod in a second fishing configuration for producing a second fishing motion, said inclined rod support being removably attachable to said jig arm so that either one of said rod holder and inclined rod support may be utilized;

a cam upon which said jig arm rests under a force of gravity; and a drive for moving said cam to cause said jig arm to oscillate and impart either one of said first and second fishing motions to the fish bait when the fishing rod is held in one of said first and second fishing configurations.

19. The device of claim 18 including a stop member for limiting the upward movement of said jig arm to an off cam position where said jig arm no longer contacts said cam.

20. The device of claim 18 including a rod positioning element for adjusting a longitudinal position of the fishing rod when held by said rod holder of said jig arm.

21. The device of claim 20 including a weight mount for removably affixing a counterweight to said jig arm to balance the fishing rod as held on said jig arm so that said jig arm is biased against said cam when the fishing rod is held on said jig arm.

22. The device of claim 18 wherein said second fishing configuration is for trolling and said oscillating jig arm causes the fishing rod and bait to move in a stop-and-go motion during trolling; and said inclined rod support holds the fishing rod in an elevated position relative to said jig arm for trolling.

23. The device of claim 22 wherein said oscillating jig arm and rod support oscillate the fishing rod generally in vertical plane from a first generally vertical position to a second, lower position when held thereby during trolling.

24. The device of claim 18 wherein said jig arm oscillates said rod holder in a jigging motion when the fishing rod is held thereby to produce said first fishing motion which simulates a natural jigging motion.

25. An automatic fishing device for automatically moving a fishing rod in a jigging motion for moving a fishing bait secured to said fishing rod in the water comprising:

a base, having a pivot, for attachment to an associated structure;

a jig arm pivotally carried adjacent a first end by said pivot for oscillating in a pivoting motion;

a rod holder carried by said jig arm for securely holding said fishing rod on said jig arm with a tip of said fishing rod extending forwardly from said first end of said jig arm;

a cam located beneath said jig arm upon which said jig arm rests under a force of gravity at a point rearward of said first end and said pivot; and a drive for moving said cam to cause said jig arm and fishing rod to oscillate imparting said jigging motion to said fish bait;

an adjustable stop member carried by said base operable to limit upward movement of said jig arm into a selected position; whereby, a strike by a fish causes said jig arm to pivot away from said cam into engagement with said stop member where it is held stationary in said selected position relieving drag on said drive, eliminating said jigging motion, and setting said hook in said fish.

26. An automatic fishing device for automatically moving a fishing bait secured to a fishing rod in the water comprising:

a base for attachment to an associated structure;

a jig arm having a pivot axis adjacent one end carried by said base for oscillating in a pivoting motion;

a rod holder, located on a first side of said pivot axis, carried by said jig arm for securely holding a handle portion of said fishing rod on said jig arm with a tip of said rod and said bait extending from the rod holder on an opposite side of said pivot axis;

a cam located beneath said jig arm upon which said jig arm rests under a force of gravity influenced by the weight of said holder and said handle portion;

a drive for moving said cam about a cam axis to cause said jig arm and fish bait to oscillate in opposing up and down jigging motions simulating a natural fishing motion to said fish bait; whereby, when a fish strikes said fishing bait, said jig arm is rotated about said pivot axis against the weight of said rod holder and said handle portion into a position off said cam, eliminating said up and down jigging motion, providing for easy removal of said rod holder from said jig arm and eliminating drag on said drive.

* * * * *